United States Patent [19]

Sohma et al.

[11] Patent Number: 5,186,146
[45] Date of Patent: Feb. 16, 1993

[54] COMBUSTION EVALUATION APPARATUS AND COMBUSTION CONTROLLER

[75] Inventors: Kenichi Sohma, Nakamachi; Tugihiro Yukitake, Tokaimura; Shigeru Azuhata; Norio Arashi, both of Hitachi; Hiroatsu Tokuda, Katsuta, all of Japan

[73] Assignee: Hitachi, Ltd., Tokyo, Japan

[21] Appl. No.: 864,129

[22] Filed: Apr. 6, 1992

Related U.S. Application Data

[63] Continuation of Ser. No. 752,991, Sep. 3, 1991, abandoned, which is a continuation of Ser. No. 631,271, Dec. 20, 1990, abandoned.

[51] Int. Cl.$^5$ .............................................. F02M 7/00
[52] U.S. Cl. ..................... 123/435; 359/170; 359/173; 359/172; 359/169; 123/494; 123/425
[58] Field of Search ............... 123/425, 435, 494, 434, 123/478, 480, 19; 359/169, 172, 320, 321, 311, 96.1, 96.15, 170, 173

[56] References Cited

U.S. PATENT DOCUMENTS

| | | | |
|---|---|---|---|
| 4,369,748 | 1/1983 | Steinke et al. | 123/425 |
| 4,397,283 | 8/1983 | Komaroff et al. | 123/494 |
| 4,419,212 | 10/1983 | Dietz et al. | 123/494 |
| 4,541,272 | 9/1985 | Bause | 73/118 |
| 4,594,968 | 6/1986 | Degobert et al. | 123/1 A |
| 4,706,629 | 11/1987 | Wineland et al. | 123/478 |
| 4,706,630 | 11/1987 | Wineland et al. | 123/478 |
| 4,770,129 | 9/1988 | Miyata et al. | 123/1 A |
| 4,941,205 | 7/1990 | Horst et al. | 359/170 |
| 4,974,552 | 12/1990 | Sickafus | 123/494 |
| 5,031,234 | 7/1991 | Primas et al. | 359/169 |
| 5,039,189 | 8/1991 | Lytel et al. | 359/173 |
| 5,040,242 | 8/1991 | Tsuchiya et al. | 359/174 |
| 5,060,302 | 10/1991 | Grimes | 359/174 |
| 5,111,333 | 5/1992 | Coles et al. | 359/175 |
| 5,111,519 | 5/1992 | Mathis | 359/170 |
| 5,125,381 | 6/1992 | Nutton et al. | 123/494 |
| 5,136,666 | 8/1992 | Anderson et al. | 359/173 |

*Primary Examiner*—Raymond A. Nelli
*Attorney, Agent, or Firm*—Antonelli, Terry, Stout & Kraus

[57] ABSTRACT

A combustion/evaluation apparatus having a sampling member for sampling light emitted from flame in an internal combustion engine, optical fibers for separating the light sampled by the sampling member into at least two lights, optical filters for selectively transmitting lights having different wavelengths by being provided in optical paths for the separated lights, photoelectric conversion elements for respectively converting optical signals transmitted through the optical filters into electrical signals, and a calculation/evaluation unit for calculating an air ratio and a temperature for evaluation of the combustion condition of the flame by using a ratio of outputs from the photoelectric conversion elements, and for evaluating the combustion condition on the basis of the air ratio and the temperature. Preferably, the air ratio is calculated based on the ratio of an electrical signal output from the photoelectric conversion element obtained from the optical signal from CH radicals and an electrical signal output from the photoelectric conversion element obtained from the optical signal from $C_2$ radicals, and the temperature is calculated from the ratio of electrical signal outputs from said photoelectric conversion elements based on an optical signal obtained from thermal radiation having wavelengths including none of the wavelengths of an optical signal obtained from radical emission.

40 Claims, 10 Drawing Sheets

WAVE LENGTH (nm)

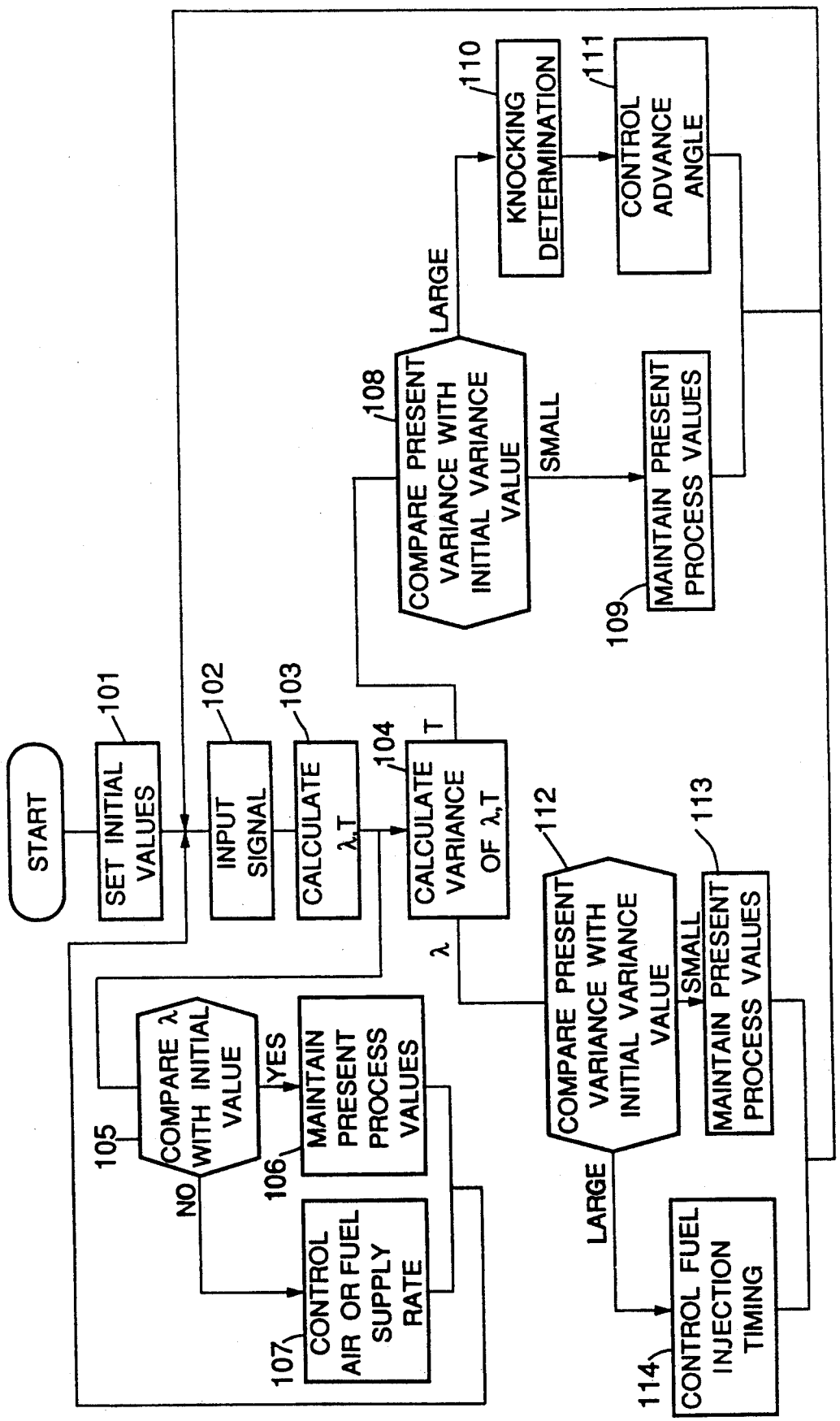

COMBUSTION EVALUATION APPARATUS AND COMBUSTION CONTROLLER

This application is a continuation application of Ser. No. 752,991, filed Sep. 3, 1991 abandoned, which is a continuation application of 631,271, filed Dec. 20, 1990, now abandoned.

BACKGROUND OF THE INVENTION

This invention relates to an apparatus for evaluating combustion from information on the air ratio, the temperature and other factors obtained from optical information on a sample of light emitted from the flame, a controller and a method for controlling the combustion, a detector and a method for detecting knocking in an internal combustion engine, a controller and a method for controlling combustion in an internal combustion engine, and a vehicle.

Many methods or systems have been disclosed in which various parameters of flame in an internal combustor, such as a boiler, a gas turbine combustor or the like, are detected and used for closed loop control to constantly maintain the flame in an optimum combustion condition. Specifically, methods of detecting light emitted from flame have been proposed. For example, with respect to internal combustion engines, Japanese Patent Laid-Open Nos. 57-108734 and 57-108735 disclose arrangements in which a quartz glass rod is disposed in a screw casing on the combustion side while an optical fiber is disposed at the opposite end to detect flame light. Japanese Patent Laid-Open No. 57-16384 discloses an apparatus relating to these detecting systems in which a center electrode is inserted into an axial center portion of the quartz glass rod and in which a screw casing portion is formed as an electrode opposite to ground to have the function of an ignition plug. Japanese Patent Laid-Open No. 61-54416 discloses a similar type of apparatus. Also, an example of a basic experiment in which flame light is sampled to obtain the air ratio by using an optical apparatus including a lens mirror and filters is described on page 3362 of the Theses of the Japan Society of Mechanical Engineering (Edition B), volume 52 (1986-9).

If knocking, which is specific abnormal combustion, takes place in an internal combustion engine, the temperature of a cylinder side wall of a piston side wall is increased and the engine is thereby damaged. It is therefore necessary to detect occurrence of knocking at an early stage with sufficient reliability and to operate the engine in an operation range immediately before the range in which knocking takes place. Various detection methods for effecting optimized combustion have therefore been proposed. For example, methods of detecting light of flame in the combustion chamber include a knocking detecting method disclosed in Japanese Patent Laid-Open No. 57-73646, in which a high-frequency optical signal generated in impulse waves formed when knocking occurs is detected. Japanese Patent Laid-Open No. 59-87249 discloses a combustion controller which samples light of flame, stores an optimum combustion state pattern signal obtained from the intensity of light emitted from the flame, compares a combustion state pattern obtained during operation with the optimum combustion state pattern, and controls the air ratio, the ignition timing and other factors so that the combustion state pattern during operation becomes equal to the optimum pattern. Similar conventional methods or apparatus are disclosed in Japanese Patent Laid-Open Nos. 61-217726 and 61-160577.

In the conventional methods or apparatus described above, light in the whole wavelength range is detected and information on the ignition time, the extinction time, the flame continuation time, the luminance and other factors can be thereby obtained, but physical quantities including the air ratio and the flame temperature cannot be obtained. The air ratio is the ratio $Qr/Q_0$ of an actual amount of air $Qr$ supplied for combustion of a certain amount of supplied fuel to a theoretical amount of air $Q_0$ necessary for completely burning the certain amount of supplied fuel. These factors cannot be obtained because wavelengths having strong correlation with the air ratio and the flame temperature are not exclusively detected while the whole emission is sampled.

In addition, the problem of non-uniformity of the flow in the fuel-air supply line to the internal combustion engine is inevitable and the air ratio on the supply basis and the actual air ratio in the internal combustion engine therefore do not coincide with each other. Owing to the influence of the difference therebetween, the air ratio and so on cannot be obtained with accuracy if the intensity of light having a particular wavelength is simply measured to obtain the air ratio.

In general, the air ratio is conventionally set to a value equal to or slightly smaller than 1 to reduce NOx with priority in consideration of prevention of environmental pollution. However, the proportion of CO is thereby increased and CO in the exhaust gas is changed into $CO_2$ by using a catalyst. Under this condition, the fuel utilization efficiency is reduced. In these circumstances, therefore, it is desirable to achieve combustion evaluation improved in accuracy.

The known optical apparatus composed of a lens mirror, filters and other components have designed without considering the method of application to internal combustion engines, and they are mere experimental apparatus.

SUMMARY OF THE INVENTION

It is an of the present invention to evaluate combustion in an internal combustion engine with improved accuracy and to control the internal combustion engine by sampling light emitted from flame and by obtaining physical quantities including the air ratio and the temperature of the flame from the sampled light.

To achieve this object, according to the present invention, there is provided an apparatus for evaluating combustion, comprising: a sampling member for sampling light emitted from flame in an internal combustion engine; a branch means for separating the light sampled by the sampling member into at least two lights; transmission means such as optical filters for transmitting lights having different wavelengths by being provided in optical paths for the separated lights; photoelectric conversion elements for respectively converting optical signals passing through the transmission means into electrical signals; and a calculation/evaluation means for calculating a physical quantity for evaluation of the combustion condition of the flame by using a ratio of outputs from the photoelectric conversion elements, and for evaluating the combustion condition of the flame on the basis of the physical quantity. Preferably, the branch means includes optical fibers capable of separating the light sampled by one sampling member into at least two lights and having emergence portions at the branching ends.

The physical quantity for evaluating combustion may comprise an air ratio having a certain correlation with the ratio of the outputs from the photoelectric conversion elements and defined as $Q_r/Q_0$. $Q_r$ is an amount of air actually supplied for combustion of a certain amount of fuel supplied, and $Q_0$ is a theoretical amount of air necessary for completely combusting the certain amount of fuel supplied.

The physical quantity for evaluating combustion may comprise a temperature having a certain correlation with the ratio of the outputs from the photoelectric conversion elements.

Preferably, the optical fibers form at least three branching optical paths, and the calculation/evaluation means calculates the air ratio from the ratio of outputs a pair of photoelectric conversion elements and calculates the temperature from the ratio of outputs from another pair of photoelectric conversion elements.

Preferably, the combination of the optical filters is a combination for separating light emitted from the flame as radical emission lights from at least two of OH radical, CH radical and $C_2$ radical.

Preferably, the air ratio is calculated based on one of the ratio of an electrical signal output from the photoelectric conversion element obtained from the optical signal from CH radical and an electrical signal output from the photoelectric conversion element obtained from the optical signal from OH radical, and the ratio of the electrical signal output from the photoelectric conversion element obtained from the optical signal from OH radical and an electrical signal output from the photoelectric conversion element obtained from the optical signal from $C_2$ radical.

Preferably, in this evaluation apparatus, the temperature is calculated from the ratio of electrical signal outputs from the photoelectric conversion elements based on an optical signal obtained from thermal radiation having wavelengths including none of the wavelengths of an optical signal obtained from radical emission.

Preferably, the combination of optical filters includes a combination for separating an optical signal obtained from thermal radiation having wavelengths including none of the wavelengths of an optical signal obtained from radical emission into at least two lights.

Preferably, in this evaluation apparatus, the calculation/evaluation means obtains the change in the physical quantity with respect to time for evaluating the combustion condition of the flame by using the change in the ratio of the outputs from the photoelectric conversion elements with respect to time in each combustion cycle from ignition to completion of combustion, calculates a pattern of frequency of occurrence of the physical value in each combustion cycle from the change in the physical value with respect to time, and compares this occurrence frequency pattern with a previously stored reference occurrence frequency pattern to evaluate the combustion condition of the flame. Preferably, in this case, the physical quantity comprises an air ratio and/or a temperature.

Preferably, this evaluation apparatus is provided with a monitor for displaying information on combustion output from the calculation/evaluation means.

According to the present invention, there is also provided a combustion controller comprising: an internal combustion engine into which fuel and air are supplied to be combusted; a combustion evaluation system having a sampling member for sampling light emitted from flame in the internal combustion engine, a branch means for separating the light sampled by the sampling member into at least two lights, transmission means such as optical filters for transmitting lights having different wavelengths by being provided in optical paths for the separated lights, photoelectric conversion elements for respectively converting optical signals passing through the transmission means into electrical signals, and calculation/evaluation means for calculating a physical quantity for evaluation of the combustion condition of the flame by using a ratio of outputs from the photoelectric conversion elements, and for evaluating the combustion condition of the flame on the basis of the physical quantity; and a control unit for outputting a control signal to change and control the state of combustion in the internal combustion engine based on a signal output from the combustion evaluation apparatus. Preferably, this controller has a plurality of combustion evaluation systems.

Preferably, in this controller, the calculation/evaluation means obtains the change in the physical quantity with respect to time for evaluating the combustion condition of the flame by using the change in the ratio of the outputs from the photoelectric conversion elements with respect to time in each combustion cycle from ignition to completion of combustion, calculates a pattern of frequency of occurrence of the physical value in each combustion cycle from the change in the physical value with respect to time, and compares this occurrence frequency pattern with a previously stored reference occurrence frequency pattern to evaluate the combustion condition of the flame.

Preferably, in this controller, the calculation/evaluation means obtains the change in air ratio and/or temperature with respect to time for evaluating the combustion condition of the flame by using the change in the ratio of the outputs from the photoelectric conversion elements with respect to time in each combustion cycle from ignition to completion of combustion, calculates a pattern of frequency of occurrence of the air ratio and/or the temperature in each combustion cycle from the change in air ratio and/or temperature with respect to time, and compares this occurrence frequency pattern with a previously stored reference occurrence frequency pattern to evaluate the combustion condition of the flame.

Preferably, in this controller, the control signal output from the control unit is sent to a supply rate adjusting unit for adjusting the rates of supply of air and fuel to the combustion chamber, an ignition timing adjusting unit, and a fuel injection timing adjusting unit. Also, this controller may be provided with a monitor for displaying information on combustion output from the calculation/evaluation means.

According to the present invention, there is also provided a method of controlling combustion comprising the steps of: sampling light emitted from flame in an internal combustion engine with one sampling member, and separating the light thereby sampled into at least two lights; transmitting the lights through means such as optical filters for transmitting lights having different wavelengths; converting optical signals passing through this means into electrical signals; calculating a physical quantity for evaluation of the combustion condition of the flame by using a ratio the electrical signals, and evaluating the combustion condition of the flame on the basis of the physical quantity; and changing and controlling the state of combustion in the internal combustion engine on the basis of the evaluation.

According to the present invention, there is also provided an apparatus for detecting knocking in an internal combustion engine, comprising: a sampling member for sampling light emitted from flame in the internal combustion engine; a branch means for separating the light sampled by the sampling member into at least two lights; transmission means such as optical filters for transmitting lights having different wavelengths by being provided in optical paths for the separated lights; photoelectric conversion elements for respectively converting optical signals passing through the transmission means into electrical signals; a calculation means for calculating the change in temperature with respect to time for evaluation of the combustion condition of the flame by using the change in a ratio of outputs from the photoelectric conversion elements with respect to time in each combustion cycle from ignition to completion of combustion, and for obtaining a pattern of frequency of occurrence of the temperature in each combustion cycle from the change in temperature with respect to time; and a determination unit for comparing the occurrence frequency pattern with a previously stored reference occurrence frequency pattern to effect determination as to whether or not the possibility of knocking is high.

According to the present invention, there is also provided a method of detecting knocking in an internal combustion engine, comprising the steps of: sampling light emitted from flame in an internal combustion engine with one sampling member, and separating the light thereby sampled into at least two lights; transmitting the lights through means such as optical filters for selectively transmitting lights having different wavelengths; converting optical signals passing through this means into electrical signals; obtaining the change in flame temperature with respect to time by using the change in a ratio of the electrical signals with respect to time in each combustion cycle from ignition to completion of combustion, and calculating a pattern of frequency of occurrence of the temperature value in each combustion cycle from the change in flame temperature with respect to time; and comparing the occurrence frequency pattern with a previously stored reference occurrence frequency pattern to effect determination as to whether or not the possibility of knocking is high.

According to the present invention, there is also provided an apparatus for controlling combustion in an internal combustion engine, comprising: a sampling member for sampling light emitted from flame in the internal combustion engine; a branch means for separating the light sampled by the sampling member into at least two lights; transmission means such as optical filters for transmitting lights having different wavelengths by being provided in optical paths for the separated lights; photoelectric conversion elements for respectively converting optical signals passing through the transmission means into electrical signals; a calculation means for calculating the change in temperature with respect to time for evaluation of the combustion condition of the flame by using the change in a ratio of outputs from the photoelectric conversion elements with respect to time in each combustion cycle from ignition to completion of combustion, and for obtaining a pattern of frequency of occurrence of the temperature in each combustion cycle from the change in temperature with respect to time; a determination unit for comparing the occurrence frequency pattern with a previously stored reference occurrence frequency pattern to effect determination as to whether or not the possibility of knocking is high; and a control unit for outputting a control signal to change and control the state of combustion in the internal combustion engine on the basis of the determination.

According to the present invention, there is further provided a method of controlling combustion in an internal combustion engine, comprising the steps of: sampling light emitted from flame in an internal combustion engine with one sampling member, and separating the light thereby sampled into at least two lights; transmitting the lights through means such as optical filters for selectively transmitting lights having different wavelengths; converting optical signals passing through this means into electrical signals; obtaining the change in flame temperature with respect to time by using the change in a ratio of the electrical signals with respect to time in each combustion cycle from ignition to completion of combustion, and calculating a pattern of frequency of occurrence of the temperature value in each combustion cycle from the change in flame temperature with respect to time; comparing the occurrence frequency pattern with a previously stored reference occurrence frequency pattern to effect determination as to whether or not the possibility of knocking is high; and changing and controlling the state of combustion in the internal combustion engine on the basis of the determination.

According to the present invention, there is further provided a motor vehicle comprising: an internal combustion engine having a cylinder, a piston reciprocatively movable in the cylinder, a combustion chamber defined by the cylinder and the piston, a fuel injection valve for injecting fuel into the combustion chamber, and an ignition plug for igniting the fuel; a combustion evaluation system having a sampling member for sampling light emitted from flame in the internal combustion engine, a branch means for separating the light sampled by the sampling member into at least two lights; transmission means such as optical filters for transmitting lights having different wavelengths by being provided in optical paths for the separated lights, photoelectric conversion elements for respectively converting optical signals passing through the transmission means into electrical signals, and a calculation/evaluation means for calculating a physical quantity for evaluation of the combustion condition of the flame by using a ratio of outputs from the photoelectric conversion elements, and for evaluating the combustion condition of the flame on the basis of the physical quantity; and a control unit for outputting a control signal to change and control the state of combustion in the internal combustion engine based on a signal output from the combustion evaluation apparatus.

The light emitted from flame and sampled by one sampling member is separated into a plurality of lights by the optical fibers and changed into lights having different wavelengths by the optical filters, and the lights thereby separated are respectively incident upon the photoelectric conversion elements. The calculation means calculates a ratio of the outputs from the photoelectric conversion elements, i.e., the ratio of a value of the electrical signal corresponding to the emission intensity at a certain wavelength and another value of the electrical signal corresponding to the emission intensity at another wavelength. If the ratio is used, the influence of a change in the size of flame due to a disturbance of supply of fuel or air can be cancelled and the air ratio and the temperature can be correctly calculated.

Actually, there is a correlation between the emission intensity the change in wavelength at a certain temperature. It is therefore possible to obtain the flame temperature by using emission intensity ratio at each wavelength.

If optical fibers are provided to form three or more separated optical paths and to obtain the intensity of emissions at three or more wavelengths, the air ratio can be obtained from one combination therebetween and the temperature can be obtained from another combination.

It is possible to maintain the combustion conditions including the air-fuel ratio of the actual internal combustion engine in an optimum state by detecting the air ratio or the temperature and thereby outputting the control signal.

The air ratio and the temperature are calculated to obtain patterns of occurrence of them in each combustion cycle. On the other hand, the patterns of emission in the combustion chamber at the time of optimum combustion are previously stored in a memory of the control unit. These patterns and the occurrence patterns in each combustion cycle are compared and the air supply rate, the fuel supply rate, the ignition timing, the fuel injection timing and other factors are controlled so as to form the optimum combustion pattern.

BRIEF DESCRIPTION OF THE DRAWINGS

FIG. 15 is a flow chart of engine control.

DESCRIPTION OF THE PREFERRED EMBODIMENTS

Embodiments of the present invention will be described below with reference to the accompanying drawings.

Figure 1:
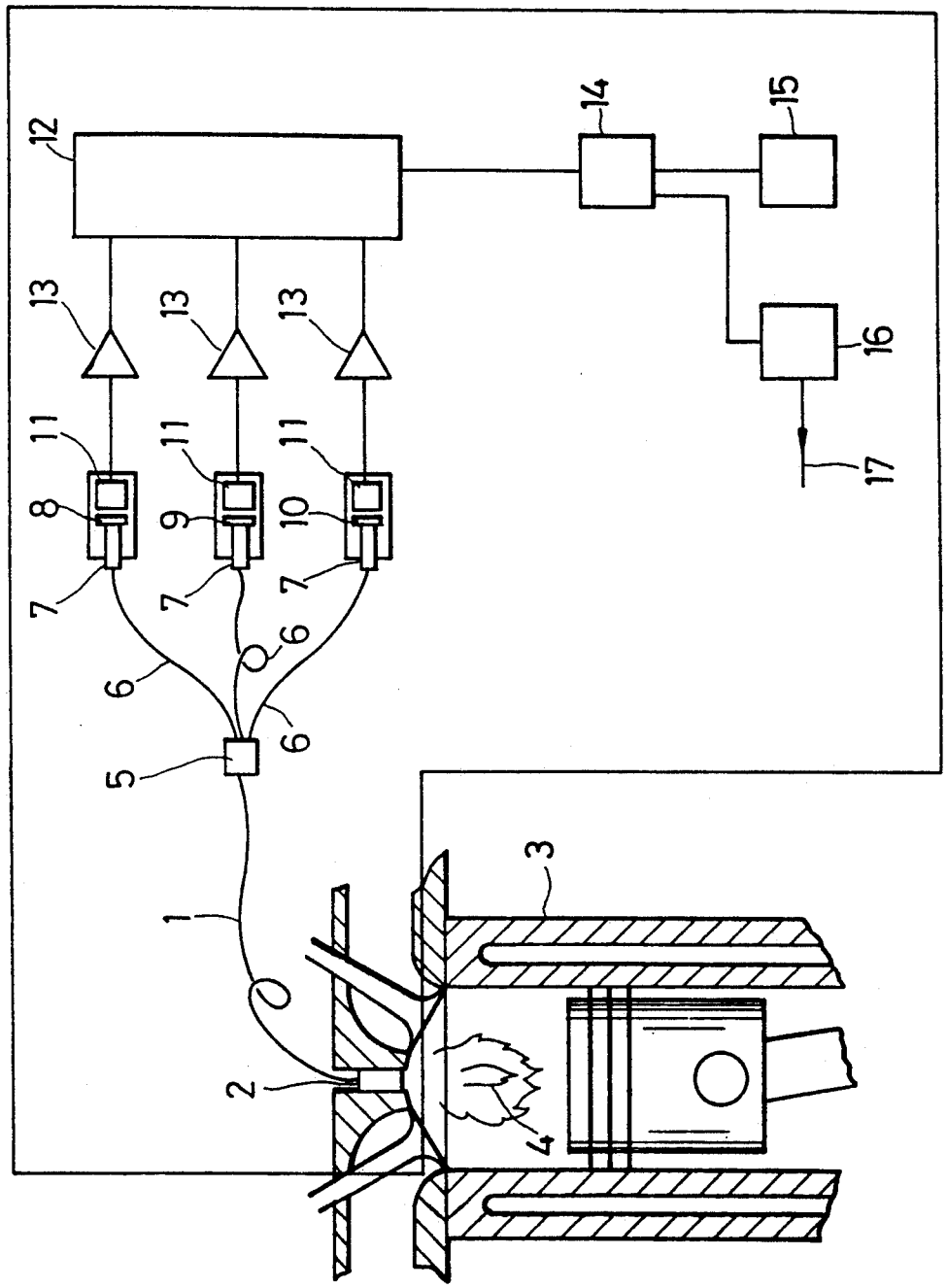
FIG. 1 is a diagram of the construction of one embodiment of the present invention.

Referring to FIG. 1, a light sampling member 2 is provided at one end of an optical fiber 1 is inserted in an internal combustion engine 3 at a position such as to observe flame 4. Light emitted from the flame 4 is sampled through the light sampling member 2. The sampled light is introduced into a branch section 5 through the optical fiber 1 to travel through a plurality of optical fibers 6 branching off from the branch section 5 and to emerge as a plurality of lights through a plurality of emergence end surfaces 7 of the optical fibers 6. The emergent lights are filtered by optical filters 8, 9, and 10 which transmit only lights whose wavelengths are different with respect to the emergence end surfaces 7. The lights thereby filtered out and having particular wavelength are incident upon photoelectric elements 11. Electric signals are output from the photoelectric elements 11 according to the intensities of the incident lights and are sent to an arithmetic unit 12. If the levels of electric signals are low, the signals are sent to the arithmetic unit 12 through amplifiers 13. In the arithmetic unit 12, the ratios of the outputs from the plurality of photoelectric elements 11 are obtained, an air ratio and a temperature are obtained from the ratios, and signals representing the air ratio and the temperature are output to an evaluation unit 14. In the evaluation unit 14, evaluation of these outputs is made to determine whether or not the physical quantities including the air ratio and temperature of the combustion flame are correct.

Information on the air ratio and the temperature is output to a monitor 15. This information is also supplied to a controller 16 to output a control signal 17 for setting optimum combustion conditions. In the case of an internal combustion engine, the control signal 17 is output to, for example, control sections for controlling the fuel injection rate, the air supply rate, the choke opening, and the ignition plug discharge time. According to this embodiment, combustion can be observed by detecting emission of light in the internal combustion engine, thereby enabling the engine to be controlled and maintained in an optimum combustion condition.

The selection of the optical filters 8, 9, and 10 with respect to wavelengths will be described below with reference to FIG. 2 which is a diagram of the result of spectroscopic analysis of light emitted from the flame of combustion of a hydrocarbon fuel, and which shows the relationship between the emission intensity (I) and the wavelength. Emissions of light represented by the spectral lines observed include particularly strong emissions 20, 21, 22, 23, and 24. Optical filters are selected through which these emissions of light 20 to 24 can pass separately. The emission spectrum 20 of about 310 nm on the shortest-wavelength side corresponds to light from OH radicals, the emission spectrum 21 of about 431 nm corresponds to light from CH radicals, and the emission spectrum 22 of about 474 nm, the emission spectrum 23 of about 517 nm and the emission spectrum 24 of a wavelength of about 564 nm correspond to light from $C_2$ radicals. The band width of transmission wavelengths of each optical filter may be set to such a width as to include none of the wavelengths of light passing through the other filters.

Figure 2:
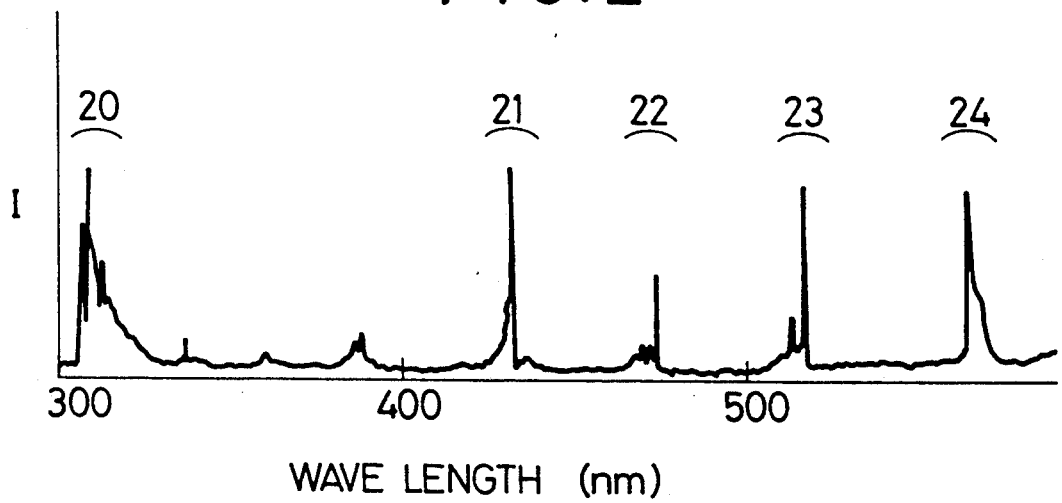
FIG. 2 is a diagram of an emission spectrum of flame when a hydrocarbon fuel is combusted.
Figure 3:
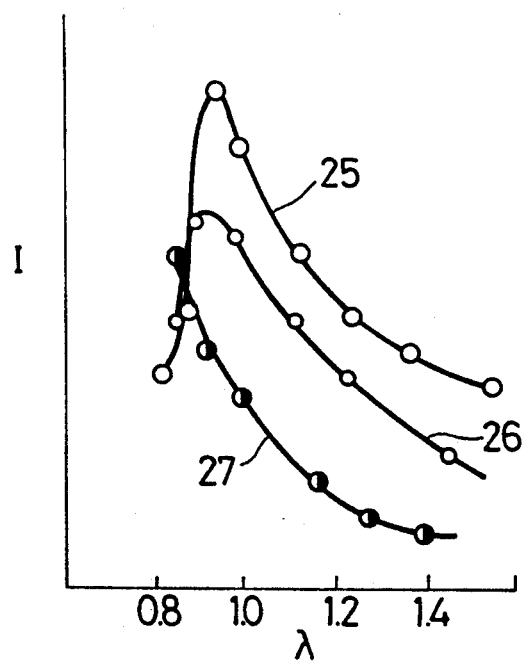
FIG. 3 is a diagram of the relationship between the emission intensity and the air ratio.

In FIG. 3, curves 25, 26 and 27 respectively represent the relationships between the air ratio ($\lambda$) and the intensities of 310 nm emission from OH radicals, 431 nm emission from CH radicals and 517 nm emission from $C_2$ radicals shown in FIG. 2. The emission intensities are obtained as outputs from the photoelectric elements 11 or the amplifiers 13 shown in FIG. 1. The air ratio is the ratio $Q_r/Q_0$ of an amount of air $Q_r$ actually supplied to a theoretical amount of air $Q_0$ necessary for completely burning an amount of fuel injected. When this ratio is larger than 1.0, the amount of air is in excess. When this ratio is smaller than 1.0, the amount of air is insufficient. When this value is equal to 1.0, the amount of air is optimum. That is, according to the relationships shown in FIG. 3, the air ratio ($\lambda$) of combustion flame can be obtained by measuring the change in the emission intensity (I).

However, when the curves 25 and 26 are used, it is possible that one value of the emission intensity may designate two values of the air ratio, and the emission intensity and the air ratio do not correspond to each other in a one-to-one manner. When the curve 27 is used, the emission intensity and the air ratio correspond in a one-to-one manner. In this case, however, if the sampling members 2 are contaminated with soot or if the overall size of the flame is reduced by a change in the load, the emission intensity is reduced although the air ratio is not changed, and the result is exhibited as if the air ratio is increased.

Figure 4:
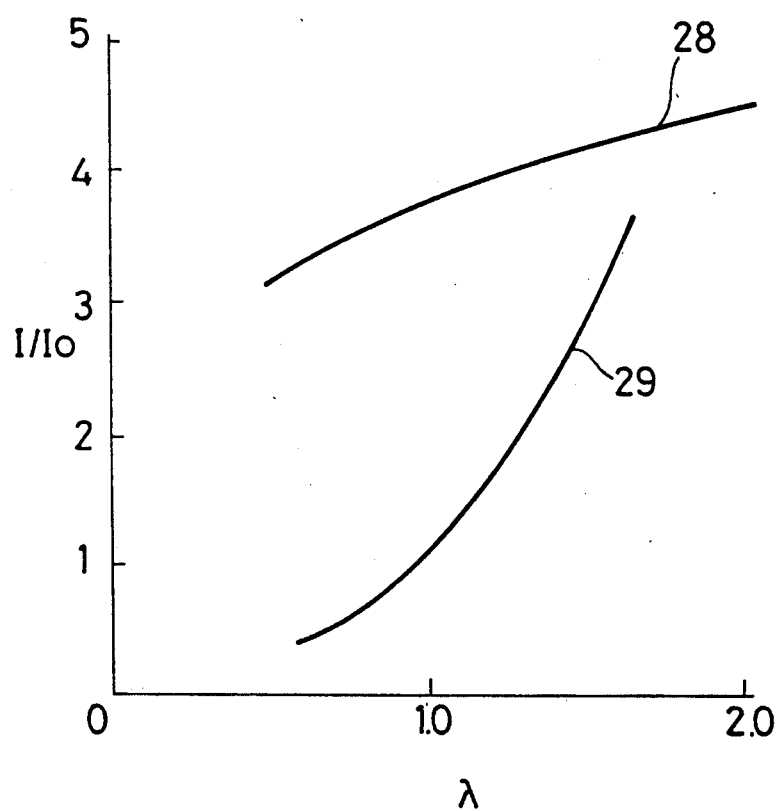
FIG. 4 is a diagram of the relationship between the ratio of emission intensities and the air ratio.

It is therefore necessary to devise a means for establishing a one-to-one correspondence between the emission intensities and the air ratio by using the relationships between the emission intensities. FIG. 4 shows an example of such a means. Curves 28 and 29 are plotted based on FIG. 3. The curve 28 represents the ratio ($I/I_0$) of the OH radical emission intensity and the $C_2$ radical emission intensity with respect to the air ratio ($\lambda$), and the curve 29 represents the ratio of the CH radical emission intensity and the $C_2$ radical emission intensity with respect to the air ratio. The result shown in FIG. 4 indicates that the above-described drawbacks can be cancelled by using the ratios between the intensities. The calculation for obtaining these ratios is performed by the arithmetic unit 12. In the evaluation unit 14, the air ratio is obtained by using these ratios, and the combustion is thereby evaluated.

Figure 5:
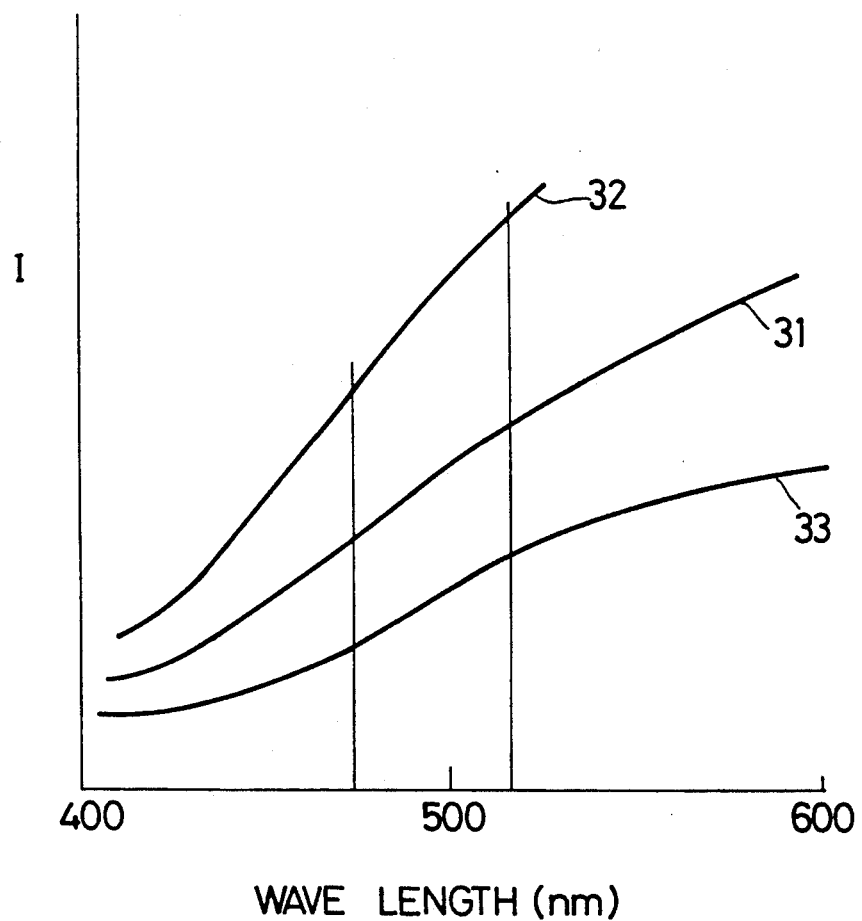
FIG. 5 is a diagram of the influence of temperature upon the emission intensity.
Figure 6:
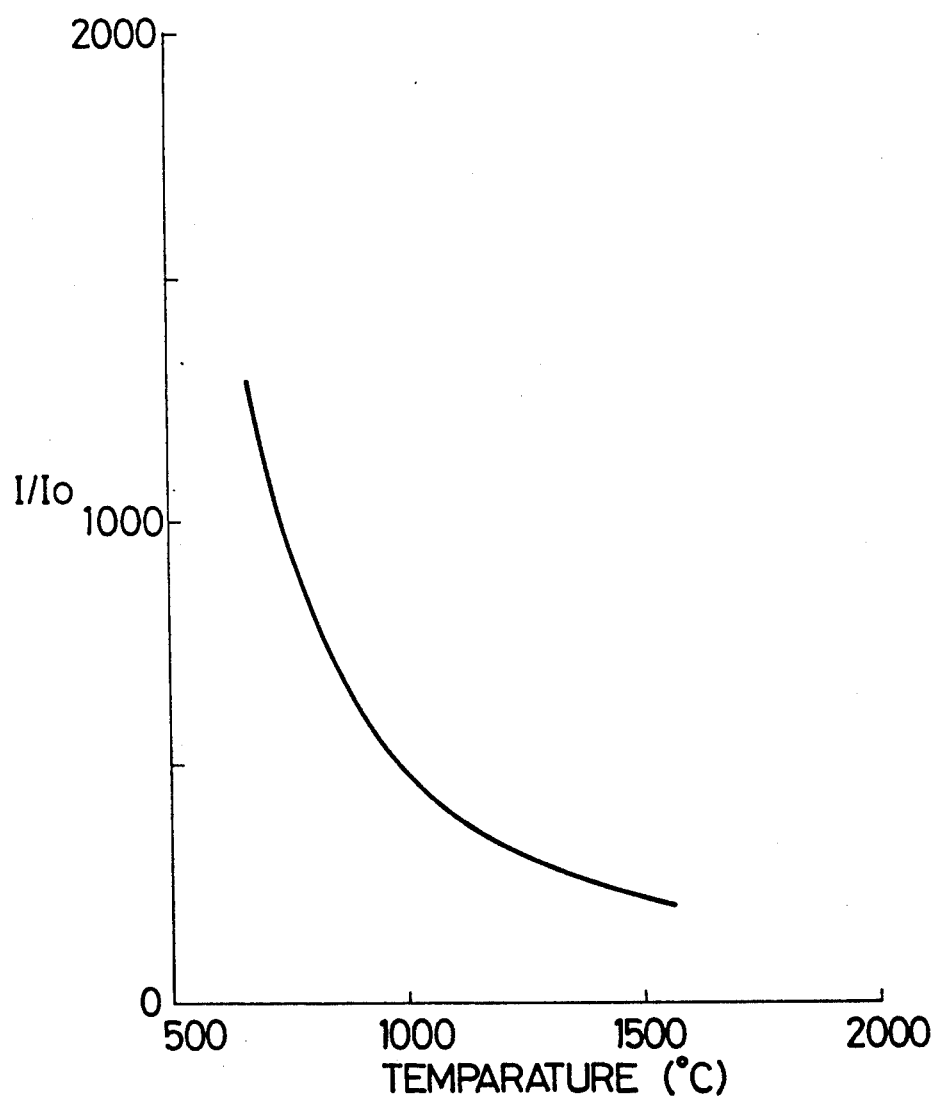
FIG. 6 is a diagram of the relationship between the ratio of emission intensities and the temperature.

The principle of temperature measurement will be described below with reference to FIG. 5 in which the ordinate represents the emission intensity (I) and abscissa represents the wavelength. As the flame temperature is increased, the quantity of light from a visible region to an infrared region is increased and the base line becomes higher. As shown in FIG. 5, an inclination of a curve representing the relationship between the emission intensity and the wavelength is increased as from a curve 30 to a curve 31 and to a curve 32 with the increase in the flame temperature. The ratio of emission intensities at arbitrary two wavelengths represents an inclination of the curve. Thus, if the inclination is larger, the temperature is higher. In this embodiment, a $C_2$ radical wavelength of 517 nm which is also used to obtain the air ratio is used as one of two arbitrary wavelengths, and another $C_2$ radical wavelength of about 474 nm, i.e., the wavelength of light from the same chemical species $C_2$ radicals in a different transition state is used as the other of the two arbitrary wavelengths. Similarly, a wavelength of 474 nm may be selected as one of two arbitrary wavelengths while a wavelength of 564 nm is selected as the other. The use of the difference in intensity between three wavelength regions (474 nm, 517 nm, and 564 nm) is possible under the condition that only the temperature changes when the air ratio is constant. Also, if wavelengths at which the emission intensity changes depending upon the change in temperature alone are selected the temperature can be obtained even when the air ratio is changed. FIG. 6 indicates that the emission intensity ratio ($I/I_O$) and the temperature (T) is in a certain relationship as represented by a curve 33, and shows the relationship between the ratio of intensities of light having a wavelength of 797 nm and light having a wavelength of 502 nm and the temperature. The emission intensities of lights having wavelengths of 797 nm and 502 nm depends greatly upon the change in temperature, and the lights having these wavelengths include no light of radical emission.

In the system shown in FIG. 1, optical filters having sampling center frequencies of 431 nm, 564 nm, and 517 nm are used as the three optical filters 8, 9, and 10. The ratio of the intensities of a pair of lights having wavelengths of 431 nm and 517 nm, i.e., the ratio of the CH radical emission intensity and the $C_2$ radical emission intensity is obtained by the arithmetic unit 12. The air ratio can be obtained by the evaluation unit 14 based on the output from the arithmetic unit 12. Simultaneously, the ratio of the intensities of another pair of lights having wavelengths of 564 nm and 517 nm is obtained by the arithmetic unit 12, and the air ratio can be obtained by the evaluation unit 14 based on the output from the arithmetic unit 12.

The system shown in FIG. 1 may alternatively be such that four branch optical fibers and four filters are provided, and that a combination of sampling center frequencies of 431 nm and 517 nm and another combination of sampling center frequencies of 502 nm and 797 nm are used. The air ratio can be obtained from the former combination and the temperature can be obtained from the latter combination. That is, in this arrangement, FIG. 6 and the curve 29 of FIG. 4 are combined. It is understood that the air ratio and the temperature thereby obtained are improved in accuracy as compared with those obtained by the arrangement using three branch optical filters because all the sampling wavelengths are independent of each other.

Figure 7:
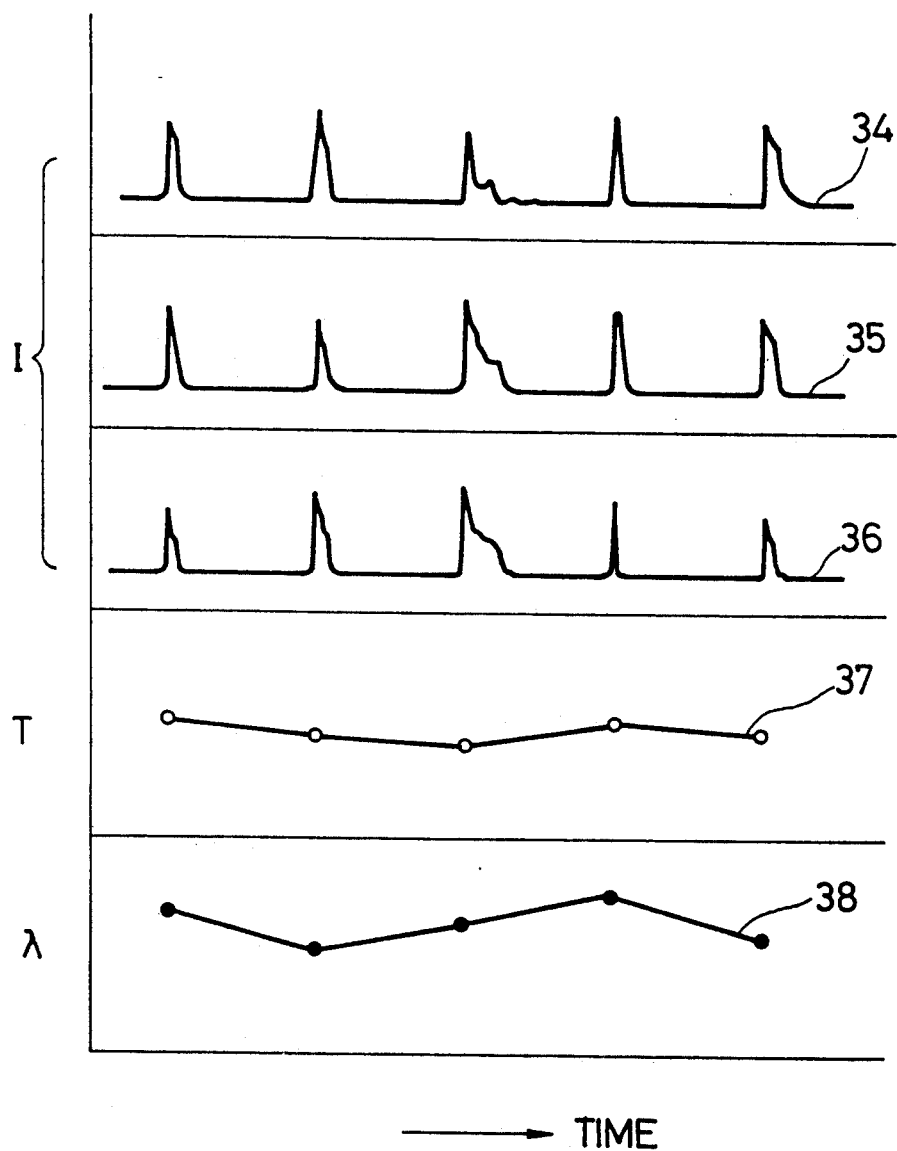
FIG. 7 is a diagram of the relationships between the ratios of emission intensities, the air ratio and the temperature measured with respect to an internal combustion engine.

FIG. 7 shows an example of measurement of an internal combustion engine in a steady-rotation state. Graphs 34, 35, and 36 show examples of the changes in the emission intensities (I). Each emission intensity increases when light is emitted by combustion. Each peak of the intensities corresponds to emission of light caused by combustion. Graphs 37 and 38 show respectively the changes in the temperature (T) and the air ratio ($\lambda$) with respect to time obtained by the evaluation unit 14 based on the changes in the emission intensities with respect to time. If the lines 37 and 38 are closer to straight lines, the stability of combustion must be higher since the engine is in a steady-rotation state. Actually, however, these lines are not straight. The fuel injection rate, the choke opening, the ignition timing and other factors are therefore controlled based on these signal outputs. In accordance with this embodiment, the temperature and the air ratio are calculated based on flame light emission in each combustion cycle and the combustion in the internal combustion engine is controlled by using the calculated values. It is thereby possible to maintain a stable combustion state. In terms of control, the absolute values of the temperature and the air ratio are necessary conditions. However, it is important to constantly maintain the relative values of them.

Figure 8:
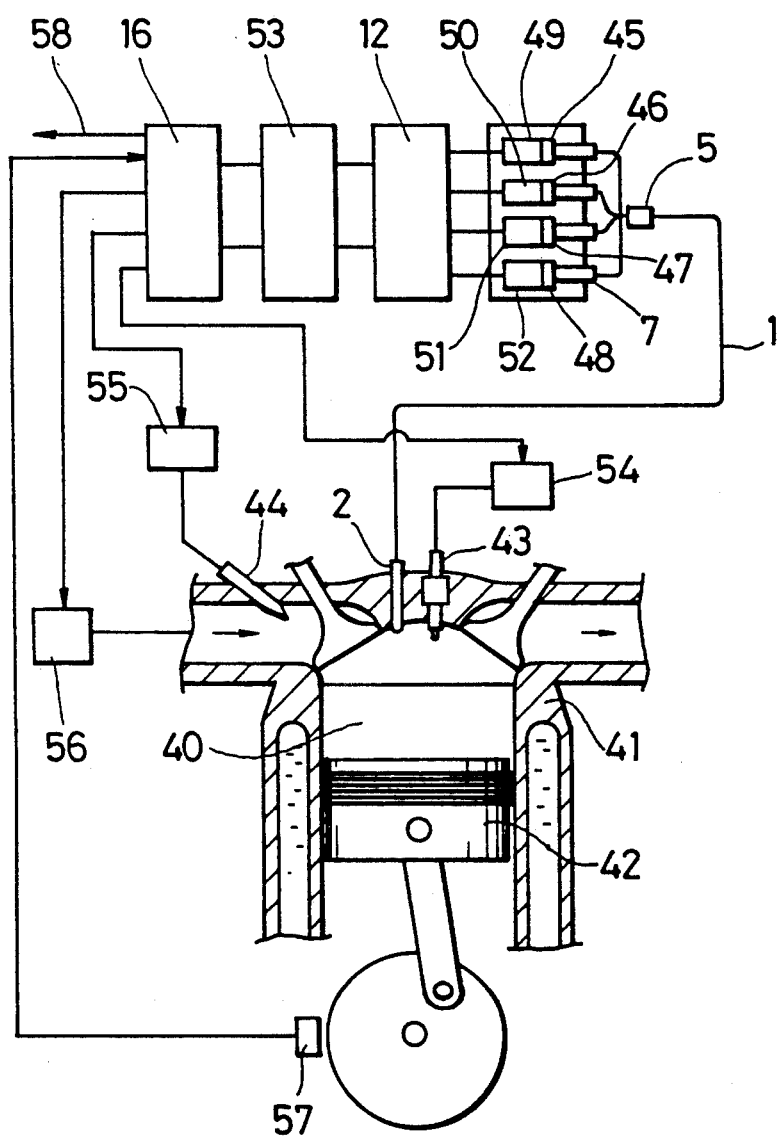
FIG. 8 is a diagram of a combustion controller for an internal combustion engine in accordance with another embodiment of the present invention.

Next, another embodiment of the present invention applied to a gasoline engine of a motor vehicle will be described below with reference to FIG. 8. The internal combustion engine has a combustion chamber 40, a cylinder 41, a piston 42, an ignition plug 43 and a fuel injection valve 44. A sampling member 2 formed of a quartz rod is provided at the top of the combustion chamber 40, and light of flame in the combustion chamber 40 is sampled through an optical fiber 1. The optical fiber 1 may comprise, for example, a bundle of a plurality of filaments formed of quartz glass and having a cladding diameter of 200 μm. The optical fiber 1 is connected to a branch section 5 from which four equal optical fibers branch off to separate the sampled light. Lights thereby separated are emitted through emergence sections 7. Optical filters 45, 46, 47, and 48 which transmits lights having particular wavelengths are respectively provided in optical paths of the four-branch optical fiber emergence sections 7. The optical filter 45 is a filter for selectively transmitting light emitted from CH radicals with a center wavelength of 431 nm. The optical filter 46 is a filter for selectively transmitting light emitted from $C_2$ radicals with a center wavelengths of 517 nm. The optical filters 47 and 48 selectively transmit light having particular wavelengths in thermal radiation light containing no light emitted from the radicals. For example, the optical filter 47 has a center wavelength of 500 nm, and the optical filter 48 has a center wavelength of 800 nm. The wavelengths of thermal radiation light selected are not limited to 500 nm and 800 nm. The wavelengths may be selected freely or, preferably, selected from a wavelength range of 500 to 1000 nm so long as they include no wavelengths of light emitted from the radicals. The transmission wavelength of an optical filter is called center wavelength, because when light is filtered, a slight quantity of light having wavelengths in the vicinity of the desired wavelength allowed to pass for a reason in terms of manufacture of the optical filter. The desired wavelength is therefore called center wavelength. The reasons for the selection of these wavelengths are as described below.

It is known that light is emitted from radicals formed in flame during a process of combusting a hydrocarbon fuel such as gasoline or light oil used for internal combustion engines during the combustion process. These radical species include OH radicals having a large emission intensity, CH radicals, and $C_2$ radicals. It is also known that radical light emission is influenced by the air ratio. Experiments have revealed that the dependency upon the air ratio with respect to OH radicals is small. Optical filters for selectively transmitting light from CH and $C_2$ radicals depending greatly upon the air ratio are therefore selected. On the other hand, fine particles of soot exist in the flame, and the temperature of soot is substantially equal to the flame temperature because the specific heat of soot is small. Emission of light, i.e., thermal radiation light from soot depends greatly upon the temperature. Wavelengths of light in this thermal radiation light are therefore utilized to measure the air ratio and the temperature.

For these reasons, lights separated by the optical filters are led to photoelectric conversion elements 49, 50, 51, and 52 to be converted into electrical signals corresponding to the intensities of the optical signals. For example, photomultiplier tubes, phototransistors, photodiodes or the like are used as the photoelectric conversion elements. If the levels of electrical signals output from the photoelectric conversion elements are small, these signals are output through amplifiers. The electrical signals output from the photoelectric conversion elements are input into an arithmetic unit 12. In the arithmetic unit 12, the ratio of the electrical signals output from the pair of photoelectric conversion elements 49 and 50 is calculated, the air ratio is obtained from this ratio, and the ratio of the outputs from the other pair of photoelectric elements 51 and 52 is calculated to obtain the temperature. Signals representing the air ration and the temperature thus obtained are sent to an occurrence pattern recognition unit 53. A signal output from the recognition unit 53 is sent to a controller 16, and the controller 16 sends control signals to an ignition timing adjustor 16, a fuel flow rate adjustor 55 and an air flow rate adjustor 56 to establish an optimum combustion condition. The controller 16 also outputs an advance angle control signal 58 for controlling the advance angle described later in detail after receiving a detection signal from a crank angle detector 57.

Figure 9:
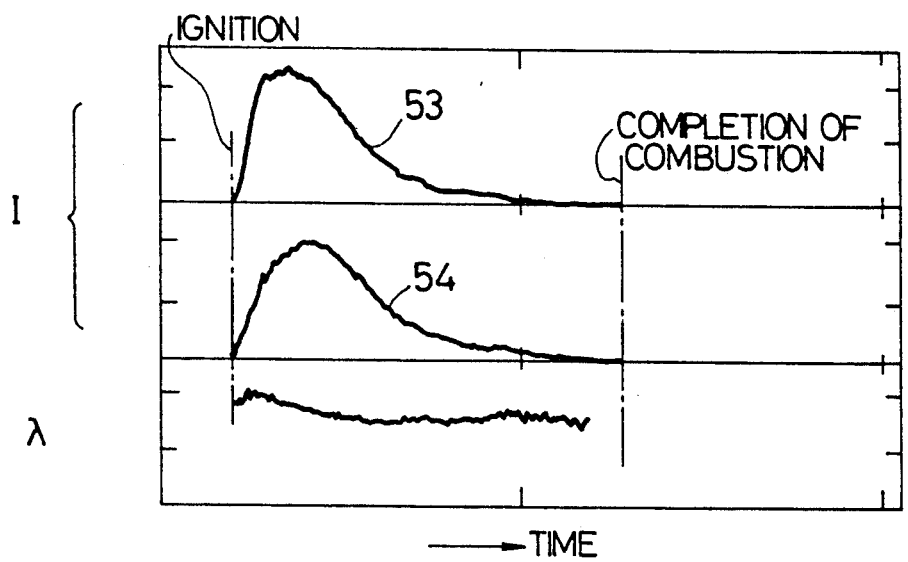
FIG. 9 is a diagram of the changes in the CH radical and $C_2$ radical emission intensities in one combustion cycle with respect to time and the change in the air ratio obtained from these intensities.
Figure 10:
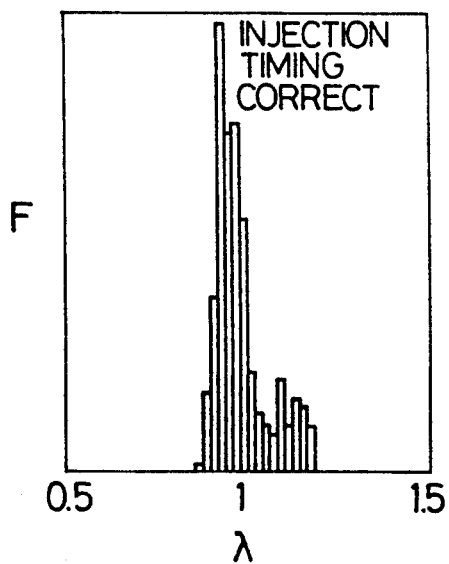
FIGS. 10 and 11 are diagrams of air ratio frequency occurrence distributions in one combustion cycle.
Figure 11:
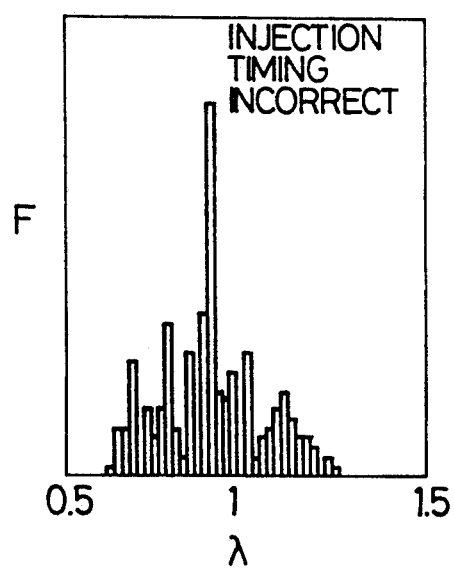

Before explanation of combustion control, the results of measurement of the air ratio and the temperature will be described below. FIG. 9 shows the result of an air ratio measurement. The mixture of fuel and air supplied to the combustion chamber is ignited with the ignition plug to start combustion, and the gas in the combustion chamber expands as the combustion proceeds, thereby applying power to the piston. FIG. 9 shows this combustion process, that is, electrical signal outputs 53, and 54 corresponding to the intensities (I) of light from CH radicals and $C_2$ radicals in one cycle, and the air ratio (λ) calculated from these two outputs. The air ratio changes with the combustion time. FIGS. 10 and 11 show the air ratio in terms of frequencies of occurrence (F). The measurement was conducted by setting an air ratio of 1.0 on the supply basis as an operating condition. In comparison between FIGS. 10 and 11, the air ratio occurrence frequency patterns shown therein are different from each other. In FIG. 10, a high frequency of occurrence is exhibited in the vicinity of the set air ratio 1. In FIG. 11, the frequency of occurrence is widely distributed. On the other hand, with respect to comparison between the amount of carbon monoxide (CO) and hydrocarbon (HC) which was an unburnt part of the combusted exhaust gas under this operating condition, the amount of unburnt components in the condition shown in FIG. 11 was about twice as large as that in the condition shown in FIG. 10. The occurrence pattern of FIG. 11 indicates that the state of combustion is bad. It is thought that this state is due to, for example, the fuel injection timing, that is, if the fuel is injected when the degree of opening of the intake valve is insufficient, fuel is attached to the intake valve so that the air ratio at the time of combustion is changed. When the injection timing is correct, the air ratio occurrence frequency pattern exhibited is centered on the set air ratio. If the fuel/air supply rates are changed, the air ratio occurrence frequency pattern is changed; if the air ratio on the supply basis is changed to, for example, 0.9 for some reason, the occurrence frequency characteristic of the measured air ratio includes a peak in the vicinity of 0.9. In this condition, unburnt gas is discharged, which causes environmental pollution, and optimum combustion is therefore required.

Figure 12:
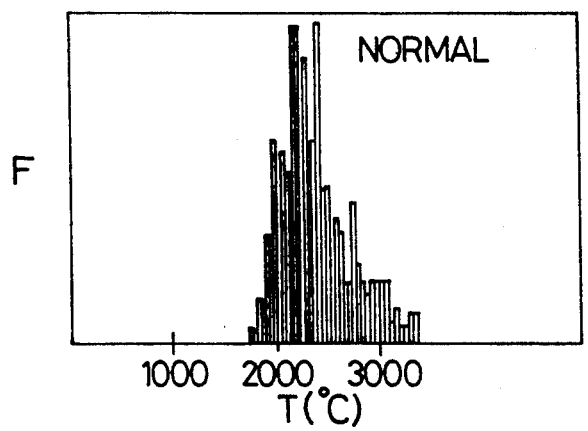
FIGS. 12, 13, and 14 are diagrams of temperature frequency occurrence distributions in one combustion cycle.
Figure 13:
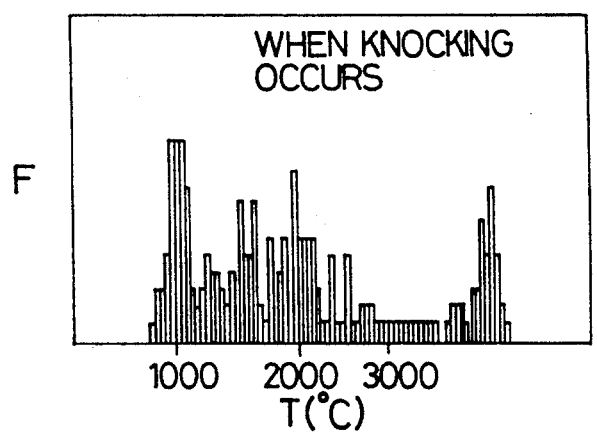
Figure 14:
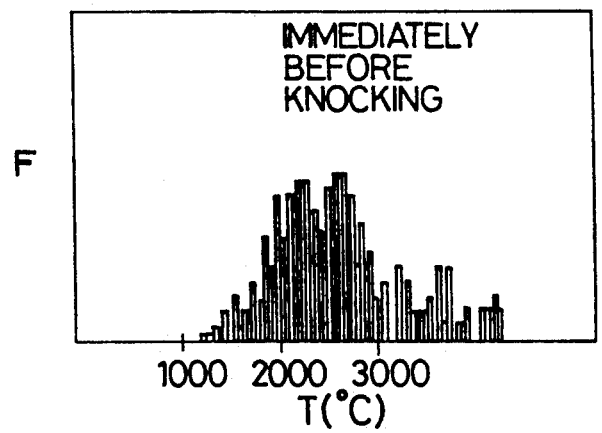

Next, the results of a temperature measurement will be described below. FIGS. 12, 13, and 14 shows the results of measurements in which temperature occurrence frequency patterns in one combustion cycle are different. FIG. 12 shows a temperature occurrence frequency pattern when the output is large in an optimum combustion condition, FIG. 13 shows a temperature occurrence frequency pattern when knocking occurs so that the output is reduced, and FIG. 14 shows a temperature occurrence frequency pattern at a time immediately before the occurrence of knocking. Referring to FIG. 12, the frequency of occurrence of temperatures in the vicinity of the average temperature is highest, and the difference between the highest temperature and the lowest temperature is about 1000° C. at the maximum. In the pattern of FIG. 13 representing the temperature occurrence frequency at the time of occurrence of knocking, the frequency of occurrence of temperatures in the vicinity of 1200° C. is highest, and the frequency of occurrence of temperatures in the vicinity of 3200° C. is the second. The difference between the highest temperature and the lowest temperature is 3000° C. or more. Also, the average temperature is about 1900° C. which is lower than that in the case of normal combustion by about 300° C. Referring to FIG. 14, the frequency of occurrence of temperatures in the vicinity of the average temperature is highest, and the difference between the highest temperature and the lowest temperature is 3000° C. or more and larger than that in the case of normal combustion. The average temperature is higher than that in the case of normal combustion. Thus, details of the state of combustion can be known from the temperature occurrence frequency patterns.

Conventionally, a state of abnormal combustion such as a knocking state can be detected only when knocking takes place. However, it is understood that according to the method of evaluation using temperature occurrence frequency patterns, a state immediately before knocking can be detected if the difference between the highest and lowest temperatures and the pattern of occurrence of temperatures such as dispersive average temperatures are examined. This temperature occurrence frequency pattern is detected and the ignition timing is controlled to maintain the combustion in the normal condition. For example, the variance representing the variation in the frequency of occurrence at the time of normal combustion is 9.5%, while the variance at the time of occurrence of knocking is 25%. Combustion control can be effected by using this variance as an index.

As is apparent from the above detailed description, the air ratio and the temperature in the combustion chamber can be obtained from flame light and, at the same time, normal combustion and abnormal combustion can be discriminated from the occurrence pattern. The occurrence pattern is therefore used for control to effect optimum combustion.

Next, an example of a flow chart of a method of detecting the air ratio and the temperature in the combustion chamber based on detection of light and controlling the engine using the values thereby obtained or variances of the same will be described below with reference to FIG. 15. First, initial values are set (step 101). As initial values, which are different with respect to the properties of the engine, a temperature, an air ratio and variances of the same desirable for a particular engine are input. Also, a temperature, an air ratio and variances of the same actually obtained during operation, and allowable errors in the desired temperature, air ratio and variances are input as other initial values. These values are predetermined experimentally.

Next, optical signals for measurement of the temperature (T) and the air ratio ($\lambda$) are input (step 102). Details of the measuring units are as shown in FIG. 1. The temperature and the air ratio are calculated by using these signals (step 103). For this step, analytical curves for calculation of the temperature and the air ratio from the intensities of these signals are previously input.

After the completion of this step, the process flow diverges into a flow for calculating variances of the temperature and the air ratio (step 104) and a flow for controlling the engine by using the air ratio (step 105).

The flow for controlling the engine by using the air ratio will be described below. The process proceeds to the step of determining the difference between the air ratio in the engine actually operated and the desired air ratio given by the initial setting. The allowable range is given by the initial setting. When the air ratio in the engine actually operated is within the allowable range, the present operation process values are maintained. The operation process values referred to herein are process values which influences the air ratio, more specifically, the air supply rate, the fuel supply rate, and other factors. If the air ratio in the engine actually operated is out of the allowable range, the air supply rate or the fuel supply rate are suitably changed (step 107). When the process values are changed, the combustion in the engine is changed and the optical signal from the flame is thereby changed. Then the flow for inputting optical signals again, calculating the air ratio and comparing the calculated value with the initial value is repeated. There is a possibility of the engine air ratio being changed out of the allowable range by some factor while the engine is actually operated, even when the process values are not changed. In such as case, the above flow is also repeated.

After calculation of the temperature and the air ratio, in the flow of calculating the variances of the temperature and the air ratio, knocking determination, control and so on are effected by using the variances (step 104). After the calculation of the temperature variance, determination is made as to whether the temperature variance is larger or smaller than or equal to the temperature variance given by initial setting (step 108). If the present temperature variance is smaller than or equal to the initial temperature variance, it is determined that the engine is not knocking, and the engine is operated by maintaining the present operation process values (step 109). If the present temperature variance is larger than the initial temperature variance, this value and other factors including the value of the output from a knocking sensor are synthetically considered to effect determination as to whether or not knocking has occurred and the possibility of occurrence of knocking. If it is determined that knocking has occurred or the engine is in a condition such as to easily start knocking (step 110), suitable countermeasures are used. Ordinarily, advance angle control is effected (step 111). The advance angle is a crank angle through which the 0° crank angle position corresponding to the top dead center of the piston is reached; it designates the angle or time at which the ignition plug is energized. Ordinarily, the advance angle is about 15°. If it is larger than 20°, the possibility of knocking is increased. However, if it is smaller, for example, several degrees, the ignition time is so late that the desired torque cannot be obtained. If the advance angle is changed, the combustion timing or the like is changed and the temperature and the variance of the same in the engine are thereby changed. The flow for optical measurement, calculation of the temperature and the temperature variance, measurement of knocking and advance angle control is therefore repeated.

After the calculation of the air ratio variance, the process proceeds to the step (112) for determination as to whether the air ratio variance is larger or smaller than or equal to the air ratio variance given by initial setting. If the present air ratio variance is smaller than or equal to the initial variance, that the engine is operated with stable combustion in each cycle, and the present process values are therefore maintained (step 113). Conversely, if the present air ratio variance is larger than the initial variance, combustion in each cycle is unstable and countermeasures are required. Ordinarily, if air and fuel are not sufficiently mixed, the variation in air ratio in one cycle is large and the variance of the air ratio is therefore large. To reduce the variance or to reduce the variation in the air ratio, fuel and air may be mixed sufficiently. As one of the means for this effect, a method of changing the fuel injection timing is used (step 114). The above-described process flow is repeated during engine operation.

According to the flow chart of this embodiment, light emitted from flame in the engine is sampled and knocking and dispersion of the air ratio are determined from the air ratio and the temperature in the engine or variances of the same, thereby controlling the engine in the desired operating condition.

According to the present invention, as described above, light emitted from flame is sampled, the light sampled is separated into a plurality of lights having different wavelengths, and the air ratio and the temperature of the flame can be obtained in a non-contact manner from the result of calculation of the ratios of intensities of lights in the plurality of wavelength ranges, thereby making it possible to evaluate combustion in the internal combustion engine at a high speed with improved accuracy. It is thereby possible to suitably observe and control the state of combustion.

What is claimed is:

1. An apparatus for evaluating combustion, comprising:
   a sampling member for sampling light emitted from flame in an internal combustion engine;
   branch means for separating the light sampled by said sampling member into at least two lights;
   means for selectively transmitting lights having different wavelengths by being provided in optical paths for the separated lights;
   photoelectric conversion elements for respectively converting optical signals passing through said transmission means into electrical signals; and
   calculation/evaluation means for calculating a physical quantity for evaluation of the combustion condition of the flame by using a ratio of outputs from said photoelectric conversion elements, and for evaluating the combustion condition of the flame on the basis of the physical quantity.

2. An apparatus for evaluating combustion according to claim 1, wherein said branch means include optical fibers capable of separating the light sampled by said one sampling member into at least two lights and having emergence portions at the branching ends.

3. An apparatus for evaluating combustion according to claim 1, wherein the physical quantity for evaluating combustion comprises an air ratio having a certain correlation with the ratio of the outputs from said photoelectric conversion elements and defined as $Q_r/Q_0$
   where $Q_r$ is an amount of air actually supplied for combustion of a certain amount of fuel supplied, and $Q_0$ is a theoretical amount of air necessary for completely combusting the certain amount of fuel supplied.

4. An apparatus for evaluating combustion according to claim 1, wherein the physical quantity for evaluating combustion comprises a temperature having a certain correlation with the ratio of the outputs from said photoelectric conversion elements.

5. An apparatus for evaluating combustion according to claim 2, wherein said optical fibers form at least three branching optical paths, and said calculation/evaluation means calculates the air ratio from the ratio of outputs a pair of photoelectric conversion elements and calculates the temperature from the ratio of outputs from another pair of photoelectric conversion elements.

6. An apparatus for evaluating combustion according to claim 1, wherein said means for selectively transmitting lights having different wavelengths includes optical filters.

7. An apparatus for evaluating combustion according to claim 1, wherein the combination of said optical filters includes a combination for separating light emitted from the flame as radical emission lights from at least two of OH radical, CH radical and $C_2$ radical.

8. An apparatus for evaluating combustion according to claim 3, wherein the air ratio is calculated based on one of the ratio of an electrical signal output from the photoelectric conversion element obtained from the optical signal from CH radical and an electrical signal output from the photoelectric conversion element obtained from the optical signal from OH radical, and the ratio of the electrical signal output from the photoelectric conversion element obtained from the optical signal from OH radical and an electrical signal output from the photoelectric conversion element obtained from the optical signal from $C_2$ radical.

9. An apparatus for evaluating combustion according to claim 4, wherein the temperature is calculated from the ratio of electrical signal outputs from said photoelectric conversion elements based on an optical signal obtained from thermal radiation having wavelengths including none of the wavelengths of an optical signal obtained from radical emission.

10. An apparatus for evaluating combustion according to claim 1, wherein the combination of optical filters includes a combination for separating an optical signal obtained from thermal radiation having wavelengths including none of the wavelengths of an optical signal obtained from radical emission into at least two lights.

11. An apparatus for evaluating combustion according to claim 1, wherein said calculation/evaluation means obtains the change in the physical quantity with respect to time for evaluating the combustion condition of the flame by using the change in the ratio of the outputs from said photoelectric conversion elements with respect to time in each combustion cycle from ignition to completion of combustion, calculates a pattern of frequency of occurrence of the physical value in each combustion cycle from the change in the physical value with respect to time, and compares this occurrence frequency pattern with a previously stored reference occurrence frequency pattern to evaluate the combustion condition of the flame.

12. An apparatus for evaluating combustion according to claim 11, wherein the physical quantity comprises an air ratio and/or a temperature.

13. An apparatus for evaluating combustion according to claim 1, further comprising a monitor for displaying information on combustion output from said calculation/evaluation means.

14. A combustion controller comprising:

an internal combustion engine into which fuel and air are supplied to be combusted;

a combustion evaluation system having a sampling member for sampling light emitted from flame in said internal combustion engine, branch means for separating the light sampled by said sampling member into at least two lights, means for selectively transmitting lights having different wavelengths by being provided in optical paths for the separated lights, photoelectric conversion elements for respectively converting optical signals passing through said transmission means into electrical signals, and calculation/evaluation means for calculating a physical quantity for evaluation of the combustion condition of the flame by using a ratio of outputs from said photoelectric conversion elements, and for evaluating the combustion condition of the flame on the basis of the physical quantity; and a control unit for outputting a control signal to change and control the state of combustion in said internal combustion engine based on a signal output from said combustion evaluation apparatus.

15. A combustion controller according to claim 14, wherein said means for selectively transmitting lights having different wavelengths includes optical filters.

16. A combustion controller according to claim 14, wherein a plurality of combustion evaluation systems are provided.

17. A combustion controller according to claim 14, said calculation/evaluation means obtains the change in the physical quantity with respect to time for evaluating the combustion condition of the flame by using the change in the ratio of the outputs from said photoelectric conversion elements with respect to time in each combustion cycle from ignition to completion of combustion, calculates a pattern of frequency of occurrence of the physical value in each combustion cycle from the change in the physical value with respect to time, and compares this occurrence frequency pattern with a previously stored reference occurrence frequency pattern to evaluate the combustion condition of the flame.

18. A combustion controller according to claim 14, said calculation/evaluation means obtains the change in air ratio and/or temperature with respect to time for evaluating the combustion condition of the flame by using the change in the ratio of the outputs from said photoelectric conversion elements with respect to time in each combustion cycle from ignition to completion of combustion, calculates a pattern of frequency of occurrence of the air ratio and/or the temperature in each combustion cycle from the change in air ratio and/or temperature with respect to time, and compares this occurrence frequency pattern with a previously stored reference occurrence frequency pattern to evaluate the combustion condition of the flame.

19. A combustion controller according to claim 14, wherein the control signal output from said control unit is sent to a supply rate adjusting unit for adjusting the rates of supply of air and fuel to the combustion chamber, an ignition timing adjusting unit, and a fuel injection timing adjusting unit.

20. A combustion controller according to claim 14, further comprising a monitor for displaying information on combustion output from said calculation/evaluation means.

21. A method of controlling combustion comprising the steps of:

sampling light emitted from flame in an internal combustion engine with one sampling member, and separating the light thereby sampled into at least two lights;

transmitting the lights through means for transmitting lights having different wavelengths;

converting optical signals passing through this means into electrical signals;

calculating a physical quantity for evaluation of the combustion condition of the flame by using a ratio the electrical signals, and evaluating the combustion condition of the flame on the basis of the physical quantity; and changing and controlling the state of combustion in the internal combustion engine on the basis of said evaluation.

22. A method of controlling combustion according to claim 21, wherein the means for transmitting lights having different wavelengths includes optical filters.

23. An apparatus for detecting knocking in an internal combustion engine, comprising:

a sampling member for sampling light emitted from flame in the internal combustion engine;

branch means for separating the light sampled by said sampling member into at least two lights;

means for selectively transmitting lights having different wavelengths by being provided in optical paths for the separated lights;

photoelectric conversion elements for respectively converting optical signals passing through said transmission means into electrical signals;

calculation means for calculating the change in temperature with respect to time for evaluation of the combustion condition of the flame by using the change in a ratio of outputs from said photoelectric conversion elements with respect to time in each combustion cycle from ignition to completion of combustion, and for obtaining a pattern of frequency of occurrence of the temperature in each combustion cycle from the change in temperature with respect to time; and a determination unit for comparing the occurrence frequency pattern with a previously stored reference occurrence frequency pattern to effect determination as to whether or not the possibility of knocking is high.

24. An apparatus for detecting knocking in an internal combustion engine according to claim 23, wherein said means for selectively transmitting lights having different wavelengths includes optical filters.

25. A method of detecting knocking in an internal combustion engine, comprising the steps of:

sampling light emitted from flame in an internal combustion engine with one sampling member, and separating the light thereby sampled into at least two lights;

transmitting the lights through means for transmitting lights having different wavelengths;

converting optical signals passing through this means into electrical signals;

obtaining the change in flame temperature with respect to time by using the change in a ratio of the electrical signals with respect to time in each combustion cycle from ignition to completion of combustion, and calculating a pattern of frequency of occurrence of the temperature value in each combustion cycle from the change in flame temperature with respect to time; and comparing the occurrence frequency pattern with a previously stored reference occurrence frequency pattern to effect determination as to whether or not the possibility of knocking is high.

26. A method of detecting knocking in an internal combustion engine according to claim 25, wherein said means for transmitting lights having different wavelengths includes optical filters.

27. An apparatus for controlling combustion in an internal combustion engine, comprising:
   a sampling member for sampling light emitted from flame in the internal combustion engine;
   branch means for separating the light sampled by said sampling member into at least two lights;
   means for selectively transmitting lights having different wavelengths by being provided in optical paths for the separated lights;
   photoelectric conversion elements for respectively converting optical signals passing through said transmission means into electrical signals;
   calculation means for calculating the change in temperature with respect to time for evaluation of the combustion condition of the flame by using the change in a ratio of outputs from said photoelectric conversion elements with respect to time in each combustion cycle from ignition to completion of combustion, and for obtaining a pattern of frequency of occurrence of the temperature in each combustion cycle from the change in temperature with respect to time;
   a determination unit for comparing the occurrence frequency pattern with a previously stored reference occurrence frequency pattern to effect determination as to whether or not the possibility of knocking is high; and
   a control unit for outputting a control signal to change and control the state of combustion in the internal combustion engine on the basis of said determination.

28. An apparatus for controlling combustion in an internal combustion engine according to claim 27, wherein said means for selectively transmitting lights having different wavelengths includes optical filters.

29. A method of controlling combustion in an internal combustion engine, comprising the steps of:
   sampling light emitted from flame in an internal combustion engine with one sampling member, and separating the light thereby sampled into at least two lights;
   transmitting the lights through means for transmitting lights having different wavelengths;
   converting optical signals passing through this means into electrical signals;
   obtaining the change in flame temperature with respect to time by using the change in a ratio of the electrical signals with respect to time in each combustion cycle from ignition to completion of combustion, and calculating a pattern of frequency of occurrence of the temperature value in each combustion cycle from the change in flame temperature with respect to time;
   comparing the occurrence frequency pattern with a previously stored reference occurrence frequency pattern to effect determination as to whether or not the possibility of knocking is high; and
   changing and controlling the state of combustion in the internal combustion engine on the basis of said determination.

30. A method of controlling combustion in an internal combustion engine according to claim 29, wherein said means for transmitting lights having different wavelengths includes optical filters.

31. A motor vehicle comprising:
   an internal combustion engine having a cylinder, a piston reciprocatively movable in said cylinder, a combustion chamber defined by said cylinder and said piston, a fuel injection valve for injecting fuel into said combustion chamber, and an ignition plug for igniting the fuel;
   a combustion evaluation system having a sampling member for sampling light emitted from flame in said internal combustion engine, branch means for separating the light sampled by said sampling member into at least two lights, means for selectively transmitting lights having different wavelengths by being provided in optical paths for the separated lights, photoelectric conversion elements for respectively converting optical signals passing through said transmission means into electrical signals, and calculation/evaluation means for calculating a physical quantity for evaluation of the combustion condition of the flame by using a ratio of outputs from said photoelectric conversion elements, and for evaluating the combustion condition of the flame on the basis of the physical quantity; and
   a control unit for outputting a control signal to change and control the state of combustion in said internal combustion engine based on a signal output from said combustion evaluation apparatus.

32. A motor vehicle according to claim 31, wherein said means for selectively transmitting lights having different wavelengths includes optical filters.

33. An apparatus for controlling combustion condition, which comprises:
   a sampling member for sampling light emitted from flame in a combustor;
   means for dividing the sampled light into at least two lights each having different wavelengths;
   means for guiding each of the divided lights to conversion means for converting each of the divided lights into an electric signal;
   calculation means for calculating a physical quantity for evaluation of the combustion condition of the flame in accordance with outputs of the signals corresponding to the divided lights from said conversion means; an
   means for providing a signal for controlling the combustion condition of said combustor in response to the signals from said calculations means.

34. An apparatus for controlling combustion condition, which comprises:
   means for separating light signal sampled by a sampling member from flame in a combustor into at least two lights each having different wavelengths;
   means for guiding each of the separated lights to conversion means for converting each of the separated lights into an electric signal;
   calculation means for calculating a physical quantity for evaluation of the combustion condition of the flame in accordance with outputs of the signals corresponding to the separated lights from said conversion means; and
   means for providing a signal for controlling the combustion condition of said combustor in response to the signal from said calculation means.

35. An apparatus for controlling combustion condition, which comprises:
a sampling member for sampling light emitted from flame in a combustor;
means for separating the sampled light into at least two lights each having different wavelengths;
means for guiding each of the separated lights through optical paths;
conversion means for converting each of the separated lights from said optical paths into an electric signal;
calculation means for calculating a physical quantity for evaluation of the combustion condition of the flame in accordance with a ratio of outputs of the signals corresponding to the separated lights from said conversion means; and
means for providing a signal for controlling the combustion condition of said combustor in response to the signal from said calculation means.

36. An apparatus for controlling combustion condition, which comprises:
a sampling member for sampling light emitted from flame in an internal combustion engine;
means for dividing the sampled light into at least two lights each having different wavelengths;
means for guiding each of the divided lights through optical paths;
conversion means for converting each of the divided lights from said optical paths into an electric signal;
calculation means for calculating a physical quantity for evaluation of the combustion condition of the flame in accordance with outputs of the signals corresponding to the separated lights from said conversion means; and
means for providing a signal for controlling the combustion condition of said internal combustion engine in response to the signal from said calculation means.

37. An apparatus for evaluating combustion condition, which comprises:
a sampling member for sampling light emitted from flame in an internal combustion engine;
means for separating the sampled light into at least two lights each having different wavelengths;
means for guiding the separated lights through optical paths to photoelectric conversion means for converting the separated lights into electric signals;
means for calculating outputs corresponding to tie electric signals from said conversion means;
means for calculating a physical quantity for evaluation of the combustion condition of the flame based upon the calculation of the outputs; and
means for evaluating the combustion condition of the flame on the basis of the physical quantity.

38. An apparatus for evaluating combustion, which comprises: means for separating light sampled by a sampling member for sampling light emitted from flame in a combustor into at least two lights each having different wavelengths;
means for guiding the separated lights through optical paths to photoelectric conversion means for converting the separated lights into electrical signals;
means for calculating a physical quantity for evaluation of the combustion condition of the flame based upon the electric signals; and
means for evaluating the combustion condition of the flame on the basis of the physical quantity.

39. An apparatus for evaluating combustion, which comprises: a sampling member for sampling light emitted from flame in an internal combustion engine;
means for separating the sampled light into at least two lights each having different wavelengths;
means for transmitting the separated lights in the respective optical paths;
conversion means for converting optical signal; passing through said transmission means into electrical signals;
calculation means for calculating a physical quantity for evaluation of the combustion condition of the flame by using outputs from said photoelectric conversion means; and
means for evaluating the combustion condition of the flame on the basis of the physical quantity.

40. An apparatus for evaluating combustion, which comprises:
a sampling member for sampling light emitted from flame in an internal combustion engine;
dividing means for dividing the sampled light into at least two lights each having different wavelengths;
picking-up means for picking up the divided lights;
conversion means for converting the picked-up lights into electrical signals;
calculation means for calculating a physical quantity for evaluation of the combustion condition of the flame on the basis of the electric signals; and
means for evaluating the combustion condition of the flame on the basis of the physical quantity.

* * * * *